Sept. 14, 1965   B. O. HEINRICH   3,206,258
CHAIN LINK AND SEAL ARRANGEMENT
Filed March 6, 1964
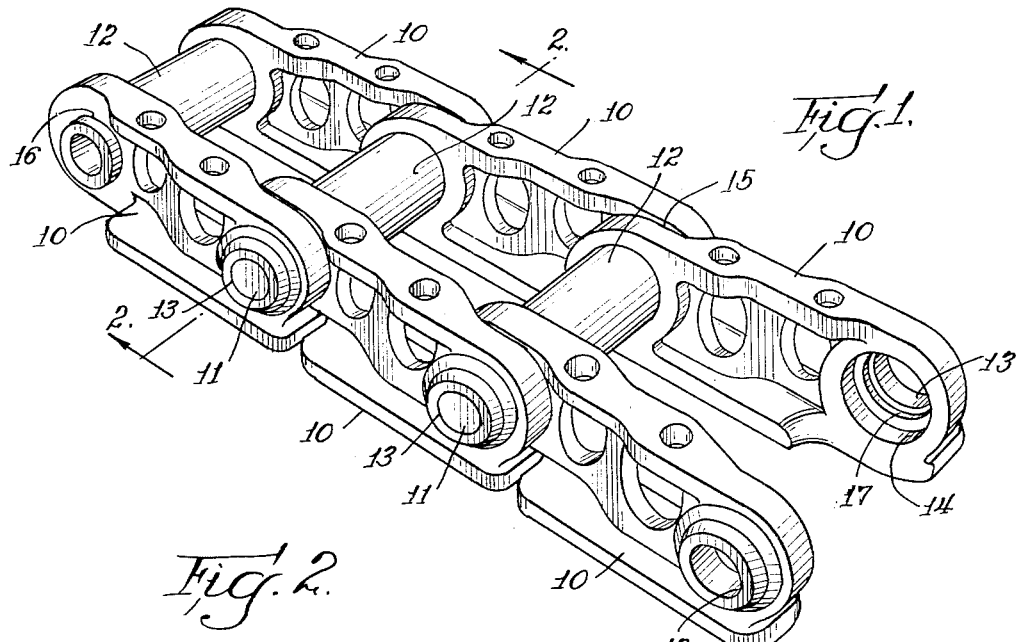
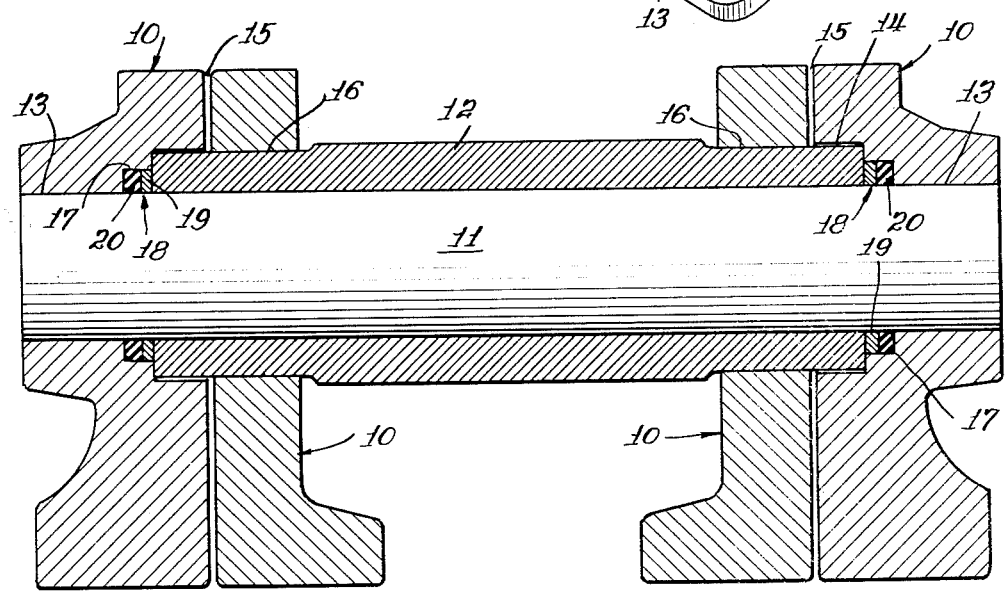
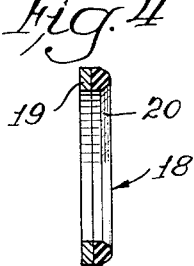
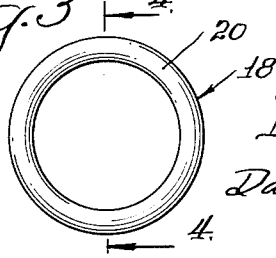
INVENTOR.
Burton O. Heinrich
BY
Darbo, Robertson &
Vandenburgh   Attys.

… … …

United States Patent Office 3,206,258
Patented Sept. 14, 1965

3,206,258
CHAIN LINK AND SEAL ARRANGEMENT
Burton O. Heinrich, Westchester, Ill., assignor to Pettibone Mulliken Corporation, Chicago, Ill., a corporation of Delaware
Filed Mar. 6, 1964, Ser. No. 349,975
1 Claim. (Cl. 305—11)

The present invention relates to improvements to increase the wear life of chains of the type employed under adverse conditions, and the following disclosure thereof is offered for public dissemination upon the grant of a patent therefor.

In many applications chains are employed under conditions of dust and dirt. An example might be the track chain on a track laying vehicle or a conveyor chain in a foundry. The dust and dirt works into the moving parts of the chain causing rapid wear and relatively short chain life. The present invention is to ameliorate this problem by providing a seal which for a dependably long life excludes the entrance of dust and dirt into the moving parts of the chain. This long life as achieved by dependably confining the necessary sliding movement of the seal to an area where the rubbing surfaces are wear-resistant and are kept in clean contact by resilient pressure supplied by a rubber-like backing material.

Further objects and advantages will become apparent from the following description taken in conjunction with the drawings in which:

FIGURE 1 is a perspective view of a portion of a chain employed on a track laying vehicle;
FIGURE 2 is a section as seen at line 2—2 of FIGURE 1;
FIGURE 3 is a view of one of the seals employed in the present invention; and
FIGURE 4 is a sectional view as seen at line 4—4 of FIGURE 3.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

FIGURE 1 illustrates three sections of a chain for a track laying vehicle such as a tractor. The chain comprises a plurality of side links 10. The links are positioned in sequential pairs. Each pair is pivotally connected to the adjacent pairs in the sequence. The structure of the pivotal connection is best illustrated in FIGURE 2. It comprises a pin 11 on which is journaled a bushing or sleeve 12. One end of each link has an opening 13 of a size to receive pin 11 while providing a so-called "drive fit." The same end of the link also has an annular recess 14 to allow that end of the link to loosely receive the adjacent end of sleeve 12. The other end of each link has an opening 16. Opening 16 is of a size to obtain a drive fit with the adjacent end of the sleeve 12. The proportions are such that the adjacent links at a joint are in juxtaposition with a relatively small space 15 therebetween as illustrated in FIGURE 2.

Dirt tends to work into the bearing surface between bushing 12 and pin 11, despite the tortuous path it must follow through narrow clearance 15 and another narrow clearance formed by recess 14. Seals have been provided in an effort to exclude the dirt, but they have failed or quickly deteriorated. To reliably exclude this dirt, I have provided a novel seal at each end of the bushing, of a form found to be very enduring. An annular recess 17 is provided in the one end of each link just beyond the respective end of the sleeves 12. Within opening 17 is positioned a seal generally 18.

Seal 18 comprises a hardened wear-resistant seal ring 19 which, with a polished or lapped surface, abuts the hardened, wear-resistant, mating end of sleeve 12. Bonded to seal ring 19 is an annular resilient member 20. Bonding may be by cement, but vulcanizing the member 20 to the seal ring 19 has been suggested by skilled consultants and is preferred. Preferably, member 20 is formed of an oil and grease resistant rubber such as neoprene (a chloroprene rubber), or Buna N (a polymerized butadiene synthetic rubber). With respect to its radial dimensions, seal 18 is of a size to easily slip into opening 17. The axial thickness of the seal 18 before insertion (the thickness as viewed in FIGURE 4) is larger than the axial length of opening 17. Thus, the resilient member 20 is in compression when it is mounted in place as illustrated in FIGURE 2. The resilient member 20 thus holds seal ring 19 firmly in contact with the adjacent end of bushing 12, which is smooth-ground and circumferentially true to be circumferentially sealed by at least the edge portion of ring 19. It is important that resilient member 20 shall also frictionally engage the link 10 with which it is in contact in such manner that all of the relative motion occurs between the end of bushing 12 and the adjacent face of seal link 19. To this end, cushion 20 should fit snugly enough in recess 17 so that compression of cushion 20 axially will expand it laterally into tight contact with the wall of recess 17, though not entirely filling the recess 17. The seal thus performs two functions, namely, the exclusion of dirt that would seek to work in from the outside and the holding of lubricant in the journal area where bushing 12 fits about pin 11. A long-life high grade lubricant should be used. Resilient member 20 maintains the proper contact pressure of seal ring 19 on bushing 12 despite the movement of the chain as it is operated about sprockets etc. To continue to perform these functions through a long life, it must and does perform a third function: the exclusion of dirt from the sliding surfaces of the seal itself. This it does by reliably confining the sliding to the circumferentially sealing surfaces of seal ring 19 and bushing 12, and maintaining them reliably in pressure contact by compressed resilient member 20.

Assembly of the chain sections may proceed as before, except that at the appropriate step, seals 18 are placed either in sockets 17 or around pin 11 just before links 10 are driven onto the ends of pin 11. The flush position of the links 10 with ends of pin 11 can determine the termination of the drive-fit movement. Links 10 can also come into contact or snug clearance from bushing 12. Wear at this contact area will occur as dirt gets into it, but is harmless inasmuch as the dirt is dependably blocked by seal 18 from reaching the bearing area.

I claim:
In a chain for use under dusty and dirty conditions such as track chain on a track laying vehicle, said chain having connecting pins with sleeves journaled thereon and shorter than the respective pins, and side links with one end of each link engaging a pin and the other end of each link engaging a sleeve on an adjacent pin, the improvement comprising: each of said one ends having a first annular recess of a diameter slightly larger in diameter than that of the adjacent end of the sleeve and into which said adjacent end projects into abutment with the link at the base of the recess, said link having a second recess, smaller in diameter than that of the first recess and extending outwardly from the first recess and about said pin, said second recess having a predetermined length axially of said pin, a seal in said second recess, said seal being annular in configuration with outer and inner diameters of a size to permit said seal to be received in said second recess and about said pin and an axial thickness greater than the axial length of said second recess, said seal being in two parts bonded together, one part being an annular wear-resistant seal ring and the other part being a resilient annular part formed of an oil resistant rubber, said one part abutting the end of said sleeve, said other part abutting the link at the base of said second recess, whereby said chain may be assembled by putting the parts together and then bringing the adjacent end of the sleeve into abutment with the link at the base of the first recess to thereby properly stress the seal in the second recess to resiliently urge the first part thereof against the end of the sleeve and to engage the second part and the link with a frictional fit confining all relative motion of the seal to movement between the one part thereof and the sleeve.

References Cited by the Examiner

UNITED STATES PATENTS

| | | | |
|---|---|---|---|
| 1,289,408 | 12/18 | Davis | 74—255 X |
| 2,699,974 | 1/55 | Deffenbaugh | 74—251 X |
| 2,906,562 | 9/59 | Burgman | 74—257 X |
| 3,050,346 | 8/62 | Simpson et al. | 74—255 X |
| 3,135,128 | 6/64 | Rudolph | 74—255 |

DON A. WAITE, *Primary Examiner.*